UNITED STATES PATENT OFFICE.

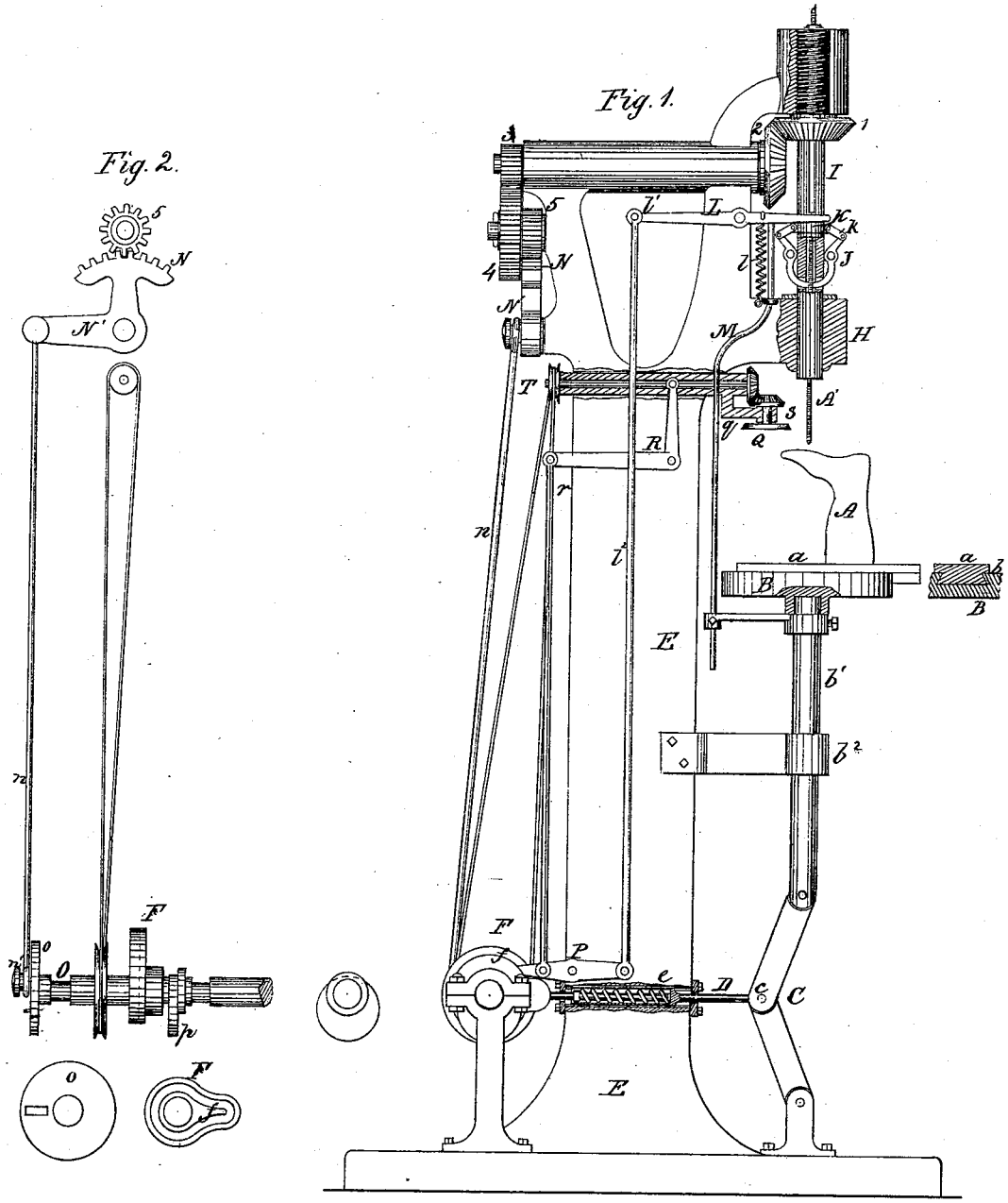

ALEXANDER C. McKNIGHT, OF PHILADELPHIA, PENNSYLVANIA.

IMPROVEMENT IN SCREW-PEGGING MACHINES.

Specification forming part of Letters Patent No. 168,042, dated September 21, 1875; application filed June 12, 1875.

*To all whom it may concern:*

Be it known that I, ALEXANDER C. MC-KNIGHT, of the city and county of Philadelphia and State of Pennsylvania, have invented a new and Improved Screw-Pegging Machine; and I do hereby declare that the following is a full, clear, and exact description of the same, reference being had to the accompanying drawing, forming a part of this specification, in which—

Figure 1 is a side elevation, partly broken away; Fig. 2, a series of detail views.

The invention relates to fastening the sole and upper of a boot or shoe by screws; and consists in certain novel means for inserting the screws or threaded wire in the leather.

These means will first be described, in connection with the drawing, and then pointed out in the claims.

A represents a last for receiving the boot or shoe that is to receive the threads and screw, while A' is a rotary screw that makes the thread. The last is adjusted for the different screws by a base-plate, $a$, that slides in the groove $b$ of a suitable table or stand, B, which is swiveled on the upper end of shaft $b^1$, which passes loosely through a guide, $b^2$, and is raised and lowered by a toggle, C. At the central joint $c$ of the toggle is pivoted a rod, D, that passes through a guide-hole, $e$, of frame E, has a lateral stud, and is operated by a cam-groove, $f$, on the side of disks F, the latter being placed on drive-shaft. The previously-prepared screws or threaded wire A' passes through guide H, in which works the hollow spindle I. The latter receives the screw A', and has two opposite slots to allow the screw-threaded jaws of nipper J to bite upon the screw, holding it and causing it to turn with the spindle.

By means of the loose collar K, straps $k\ k$, and spring $l$, the lever L is drawn downwardly upon the collar, so as to keep the screw-threaded jaws closed upon the screw; but when the threaded wire has passed the proper distance into the leather the front arm of lever strikes a gage, M, whereby the nipper-jaws cease to bite the wire, and the wire ceases to turn with the spindle, as well as to penetrate the leather.

The spindle I is connected by a train of wheels, 1 2 3 4 5, with an arc-rack, N, on the end of an elbow-lever, N', and this is vibrated by a rod, $n$, and wrist-pin $n'$ on the pulley $o$ of drive-shaft O.

Each forward vibration of rack-bar N inserts a screw, and the return movement places the spindle in position for inserting another as soon as the last is adjusted.

In order to raise the lever L completely from the collar of nippers, when the requisite length of screw has been inserted, I connect the end $l^1$ by a rod, $l^2$, with a lever, P, that is operated by a cam, $p$, on the drive-shaft O.

Q is a horizontal rotary cutter in a sliding head, $q$, that is operated by a lever, R, whose rear end is connected by a rod, $r$, with the power-arm of lever P, the cutter being thus placed in position for cutting off the wire just as the nippers cease to hold it. The knife or cutter is on a shaft, S, that has a pinion gearing with one on a shaft, T, which is driven by the end pulley U.

Heretofore these kind of machines have been run by hand, and the wire threaded by passing it through a die just before it enters the leather; but in a machine driven by other than hand-power the wire is so much heated by the threading operation as to burn the leather. I therefore use wires or screws previously threaded, so that they will be cold, and not produce this effect.

I do not claim, broadly, a last adapted to slide to and fro, and turn on a vertical support, such forming no part of my invention.

Having thus described my invention, what I claim as new is—

1. The combination, with spindle I, of wheels 1 2 3 4 5, rack-lever N N', rod $n$, and pulley O, having wrist-pin $o$, to move the spindle up and down.

2. The combination of lever L, rod $l^2$, lever P, and shaft, having cam $p$, to lift the spring-lever L at the time specified.